United States Patent [19]
Marchetti et al.

[11] 3,975,250
[45] Aug. 17, 1976

[54] ELECTRODEPOSITION WITH REACTIVE MODIFIER FOR AMINE GROUP-CONTAINING, ACID-SOLUBILIZED RESINS

[75] Inventors: Joseph R. Marchetti, Greensburg; Robert D. Jerabek, Glenshaw, both of Pa.

[73] Assignee: PPG Industries, Inc., Pittsburgh, Pa.

[22] Filed: Feb. 5, 1975

[21] Appl. No.: 547,326

Related U.S. Application Data

[60] Continuation-in-part of Ser. No. 430,325, Jan. 2, 1974, abandoned, which is a division of Ser. No. 248,753, April 28, 1972, abandoned, which is a continuation-in-part of Ser. No. 193,591, Oct. 28, 1971, abandoned.

[52] U.S. Cl. ............................................. 204/181
[51] Int. Cl.² ................... C25D 13/06; C25D 13/10

[58] Field of Search ................................. 204/181

[56] References Cited
UNITED STATES PATENTS

| 3,617,367 | 11/1971 | Cummings | 204/181 |
| 3,799,854 | 3/1974 | Jerabek | 204/181 |

*Primary Examiner*—Howard S. Williams
*Attorney, Agent, or Firm*—William J. Uhl

[57] ABSTRACT

Long chain compounds containing both mono-substituted urea linkages, as well as urethane linkages, have been prepared which serve as reactive plasticizers with resins containing epoxy, amine and hydroxyl groups. These materials are particularly useful as reactive plasticizers with cationic electrodepositable compositions containing acid solubilized base groups.

8 Claims, No Drawings

ELECTRODEPOSITION WITH REACTIVE MODIFIER FOR AMINE GROUP-CONTAINING, ACID-SOLUBILIZED RESINS

CROSS-REFERENCE TO RELATED APPLICATIONS

This application is a continuation-in-part of U.S. copending application Ser. No. 430,325 filed Jan 2, 1974, now abandoned, which is a division of U.S. Application Ser. No. 248,753 filed Apr. 28, 1972, now abandoned, which in turn is a continuation-in-part of application Ser. No. 193,591, filed Oct. 28, 1971, now abandoned.

STATE OF THE ART

Electrodeposition of aqueous organic coatings has risen to industrial prominence in recent years. The process has many advantages including uniformity and completeness of coating, even on intricate shapes, labor savings and pollution abatement. Virtually any electrically-conductive substrate can be coated. However, the process has been primarily employed to prime ferrous metal substrates.

Particular interest has recently arisen in cationic electrodeposition coatings, that is, coatings which deposit on the cathode, since when the article is the cathode, there is greatly reduced metal ion dissolution, which commonly causes staining in certain anionic systems.

One route to cationic electrodeposition is to utilize synthetic organic resins having amine groups which are solubilized with an acid. A number of resins employed, however, lack sufficient flexibility or impact resistance for certain end uses. Therefore, it is frequently advantageous to incorporate into the electrodepositable system a plasticizer.

DESCRIPTION OF THE INVENTION

This invention relates to co-reactive plasticizers or modifiers which impart flexibility to both cationic electrodeposition systems and water-dispersible coating systems which depend on acid salt formation for solubility. These reactive modifiers are adducts which contain both mono-substituted urea linkages as well as urethane linkages and are formed by the reaction of primary or secondary diamines having chain lengths of greater than five members with a selectively semi-capped polyisocyanate.

The diamine utilized to prepare the adduct of this invention may be essentially any diamine containing an acyclic chain, preferably consisting of carbon or carbon and oxygen, having more than five members between the amine groups. Particularly useful are diamines having molecular weights between about 200 and 2000. Examples of these diamines include polymethylene diamines such as hexamethylene diamine and higher homologs including the 36 carbon atom dimer diamine derived from dimerized 18 carbon fatty acids. Particularly useful are the polyoxypropylenediamines of molecular weight between 200 and 2000, such as the JEFFAMINE series of diamines manufactured by Jefferson Chemical Company. Also useful are diamines derived from diamine diepoxide reactions at a 2:1 mole ratio, for example, 2 moles of piperazine with one mole of 1,6-hexanediol diglycidyl ether.

The partially- or semi-capped or blocked isocyanate which may be employed in preparing the compositions of the invention may be any polyisocyanate where a portion of the isocyanato groups have been reacted with a compound so that the resultant capped isocyanate portion is stable to hydroxyl or amine groups at room temperature but reactive with hydroxyl or amine groups at elevated temperatures, usually between about 200°F. and about 600°F. The semi-capped polyisocyanate employed should contain an average of about one free reactive isocyanate group.

In the preparation of the partially-blocked organic polyisocyanate, any suitable organic polyisocyanate may be used; representative examples are the aliphatic compounds such as trimethylene, tetramethylene, pentamethylene, hexamethylene, 1,2-propylene, 1,2-butylene, 2,3-butylene, 1,3-butylene, ethylidine and bitylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toylene, or mixtures thereof, 4,4'-toluidine, and 1,4-xylyene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyldimethyl methane-2,2',5,5'-tetraisocyanate; the polymerized polyisocyanates such as tolylene diisocyanate dimers and trimers, and the like.

Preferably, the polyisocyanate employed should have isocyanate groups with varied reactivity to facilitate the partially-blocking reaction.

In addition, the organic polyisocyanate may be a prepolymer derived from a polyol such as a polyether polyol or polyester polyol. Examples include polyethers which are reacted with excess polyisocyanates to form isocyanate-terminated prepolymers may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic, aromatic alkyl mono-alcohol and phenolic compound may be used as a blocking agent in accordance with the present invention, such as, for example, lower aliphatic alcohols, such as methyl, ethyl, chloroethyl, propyl, butyl, amyl, hexyl, keptyl, octyl, nonyl, 3,3,5-trimethylhexanol, decyl and lauryl alcohols, and the like; the cycloaliphatic alcohols, such as, for example, cyclopentanol, cyclohexanol, and the like; the aromatic alkyl alcohols, such as, phenylcarbinol, methylphenylcarbinol, ethylene glycol monoethyl ether, ethylene glycol monobutyl ether, and the like; the phenolic compounds such as phenol itself, substituted phenols in which the substitutents do not affect the coating operations. Examples include aresol, xylol, nitrophenol, chlorophenol, ethyl phenol t-butyl phenol and 2,5-di-t-butyl-4-hydroxyl toluene. Minor amounts of higher molecular weight, relatively non-volatile monoalcohols may be used, serve as plasticizers in the coating provided by this invention.

Additional blocking agents include oximes such as methyl ethyl ketone oxime, acetone oxime and cyclohexanone oxime. Use of oximes and phenols is particularly desirable because specific polyisocyanates blocked with phenols and oximes unblock at relatively low temperatures without the need for externally added urethane-forming catalyst such as tin catalyst described below.

The semi-capped organic polyisocyanate is formed by reacting a sufficient quantity of blocking agent with the organic polyisocyanate to provide a product having one free isocyanate group remaining. Solvents free of active hydrogen may be employed if desired.

The adduct is formed by reacting the semi-capped isocyanate and the polyamine in a ratio of approximately 2 moles of capped isocyanate per mole of diamine to provide an adduct containing a plurality of terminal capped isocyanate groups separated by an internal acyclic chain of the diamine. Preferably, this reaction is conducted at low or moderate temperatures, generally less than about 120°C., to achieve selective partial capping. Temperatures of about 100°C. are commonly employed.

As previously stated, the above-described reactive adducts are combined with a polyamine group-containing resin and the mixture solubilized with an acid to form coating compositions. The two components remain stable and essentially non-reactive until a coating film is formed and the coating cured at elevated temperatures, at which time the isocyanate groups are uncapped and react with the polyamine resin, chemically combining therewith.

The latent reactive adducts of this invention may be employed to modify virtually any polyamine group-containing resin which can be acid solubilized and employed as an aqueous coating composition. Preferably the resin also contains hydroxyl groups. The resins include multi-component resin systems which contain two essential components, for example, a polyamine group-containing resin together with a fully capped organic polyisocyanate described in copending applications Ser. Nos. 47,917, filed June 19, 1970, now U.S. Pat. No. 3,799,854 and 193,590, filed Oct. 28, 1971, now abandoned, which are hereby incorporated by reference; as well as in systems containing an essentially self-curing resin system, for example, resin-containing amine groups, hydroxyl groups, and capped isocyanate groups within the same molecule, where the capped isocyanate groups are stable at room temperature in the presence of hydroxyl or amine groups but are reactive with hydroxyl groups at elevated temperatures. Preferably, the isocyanate groups are capped with an aliphatic alkyl, alkoxyalkyl, cycloaliphatic alkyl, phenolic compound, or aromatic alkyl monoalcohol or an oxime. Preferably, the resin contains about 0.5 to about 2.0 latent isocyanate groups per hydroxyl group. Resins within this class are described in copending applications Ser. No. 193,591, filed Oct. 28, 1971 and Ser. No. 203,875, filed Dec. 1, 1971, both now abandoned, which are hereby incorporated by reference.

The reactive adduct is preferably mixed with the acid solubilized polybasic resin in amounts of from about 5 percent to about 25 percent, based upon total weight of the mixture.

It is usually necessary in order to insure rapid and complete reaction of the two components which are present in the coating mixture to employ a catalyst for urethane formation. However, if curing temperatures after deposition are high enough catalyst may not be needed. Examples of externally added catalyst are the tin compounds such as dibutyl tin dilaurate and dibutyl tin diacetate are preferred, but other catalysts for urethane formation known in the art may be employed. The amount of catalyst employed in the process is that amount which effectively promotes reaction in the coated films. Amounts varying from about 0.5 percent to about 4 percent by weight of the reactive adduct may be employed.

Aqueous compositions containing the above components are highly useful as coating compositions and are particularly suited for electrodeposition, although they may be applied by conventional coating means. It is necessary to add a neutralizing agent to obtain a suitable aqueous composition. Preferably, the solution of the coating has a pH between about 3 and about 9.

Neutralization of these products is accomplished by the reaction of all or part of the amino groups, by water-soluble acid, for example, formic acid, acetic acid, phosphoric acid, or the like. The extent of neutralization depends upon the particular resin system, and it is only necessary that sufficient acid be added to solubilize or disperse the resin. Water-base compositions and particularly electrodepositable compositions, while referred to as solubilized, in fact are considered complex solutions, dispersions or suspensions or combinations of one or more of these classes in water, which act as electrolytes under the influence of an electric current. While, no doubt, in some cases the resin is in solution, it is clear that in some cases, and perhaps in most, the resin is a dispersion which may be called a molecular dispersion of molecular size between a colloidal suspension and a true solution.

The concentration of the product in water depends upon the process parameters to be used and is in general not critical. Ordinarily the major portion of the aqueous composition is water. For example, the composition may contain 1 to 25 percent by weight of resin in most cases. In most instances a pigment composition and, if desired various additives, such as antioxidant, surface-active agents, coupling solvents, and the like, known in the coating art generally and particularly in the electrodeposition art, may be included. The pigment coomposition may be of any conventional type, comprising, for example, one or more pigments such as iron oxide, lead oxide, strontium chromate, carbon black, titanium dioxide, talc, barium sulfate, cadmium yellow, cadmium red, chromic yellow, and the like.

In electrodeposition processes employing the aqueous coating compositions described above, the aqueous composition is placed in contact with an electrically-conductive anode and an electrically-conductive cathode in an electric circuit. While in contact with the bath containing the coating composition, an adherent film of the coating composition is deposited on the cathode. This is in contrast to process utilizing polycarboxylic acid resins which deposit on the anode, and many of the advantages described above are in large part attributed to this cathodic deposition.

The conditions under which the electrodeposition is carried out are in general similar to those used in electrodeposition of other types of coatings. The applied voltage may be varied greatly and can be, for example, as low as 1 volt or as high as several thousand volts, although typically between 50 volts and 500 volts. The current density is usually between about 1.0 ampere and 15 amperes per square foot, and tends to decrease during electrodeposition.

The method of the invention is applicable to the coating of any electrically-conductive substrate, and especially metals such as steel, aluminum, copper or the like.

After deposition, the coating is cured at elevated temperatures by any convenient method such as in baking ovens or with banks of infrared heat lamps.

Illustrating the invention are the following examples, which, however, are not to be construed as limiting the invention to their details. All parts and percentages in the examples, as well as throughout this specification, are by weight unless otherwise specified.

EXAMPLE A

A cationic pigment dispersant was prepared by heating 746.2 parts of stearyl glycidyl ether (Proctor & Gambl's Epoxide 45) and 224 parts of ethylene glycol monobutyl ether to about 50°C. and adding 150.2 parts of n-methyl ethanolamine over a 30-minute period with external cooling to keep the batch temperature below 100°C. When all the amine was added, the batch was held an additional hour at 100°C. before cooling and storage.

To prepare a grinding vehicle from this cationic pigment dispersant, 200 parts were blended with 38.5 parts of 88 percent lactic acid and 515 parts of deionized water.

To prepare a pigment paste, 90 parts of this grinding vehicle was blended with four parts of acetylenic alcohol defoamer (Surfynol 104-A), 60 parts of phthalocyanine blue, 140 parts of iron oxide brown and 306 parts of deionized water, and the resultant slurry ground in a suitable mill to a Hegman No. 7.

EXAMPLE I

An amine-epoxy adduct was prepared as follows:

One thousand eight hundred thirty parts of polyglycidyl ether of bisphenol A (Epon 1004) possessing an epoxy equivalent weight of 915 were dissolved in 353.2 parts of methyl butyl ketone by heating to reflux at 130°C. with agitation in order to remove any water product by use of a decanting trap in the distillate return line. Upon cooling to 80°C. under a dry nitrogen blanket, 52 parts of the diketimine derived from 1 mole of diethylene triamine and 2 moles of methyl isobutyl ketone (as described in U.S. Pat. No. 3,523,925) and 138.8 parts diethylamine were added and the batch heated to 120°C., where it was held approximately 2 hours and then thinned with 326 parts of propylene glycol monomethyl ether. The resultant polytertiary amine cationic resin containing potential primary amine groups (to be generated from the ketimine moiety upon water addition) was stored for subsequent use. This product was identified as Adduct C.

In order to prepare a reactive cationic plasticizer, the 2-ethylhexanol monourethane of 2,4-toluene diisocyanate was first prepared by adding 1953 parts of 2-ethylhexanol to 2610 parts of 2,4-toluene diisocyanate and 200 parts methyl butyl ketone over a 5-hour period with agitation and external cooling to maintain the batch reaction temperature below 20°C. The batch was then thinned with 100 parts of methyl butyl ketone and stored under dry nitrogen.

In another reactor, 456 parts of the above 2-ethylhexanol monourethane of 2,4-TDI (1.5 equivalents of free isocyanate) was added to 769.5 parts (1.5 equivalents of polyoxypropylene diamine) (Jefferson's Jeffamine D-1000) possessing an amine equivalent weight of 512 over a 20 minute period at 40°C., and then thinned with 189 parts of methylbutyl ketone to yield a reactive cationic plasticizer of 85.2 percent non-volatile content.

In another reactor, the 2-ethylhexanol diurethane of 80/20 2,4/2,6-toluene diisocyanate was prepared by slowly adding 87.1 parts of 80/20 2,4/2,6-TDI to 143 parts of 2-ethylhexanol containing one drop of dibutyl tin dilaurate with external cooling to maintain the reaction mixture below 100°C.

To prepare an electrodepositable thermosetting cationic urethane composition, 741 parts of the above polytertiary amine cationic resin (Adduct C), 57 parts of ethylene glycol monohexyl ether, 134 parts of the above reactive cationic plasticizer, 231 parts of the above 2-ethylhexyl diurethane and 18 parts dibutyl tin dilaurate catalyst were blended and then solubilized with 46 parts of 88 percent lactic acid and 1773 parts deionized water.

To pigment this composition, 1216 parts of it were blended with 247 parts of the pigment paste described in Example A, and the batch thinned to about 12 percent non-volatile content with 2337 parts of deionized water.

This electrodeposition bath showed a pH of 6.0 and 2 minute throwpower of 10 inches at 280 volts. Films deposited cathodically for 2 minutes at 280 volts on zinc phosphated steel and baked 45 minutes at 350°F. yielded smooth, hard, flexible films of 0.5 mil thickness.

EXAMPLE II

A polytertiary amine cationic resin was prepared as follows:

Into a suitable reactor were charged 145.8 parts by weight of methyl isobutyl ketone, and 1048 parts by weight of a polyglycidyl ether derived from the condensation of bisphenol A and epichlorohydrin, possessing an epoxy equivalent weight of 524 (EPON 1001). The mixture was dissolved with agitation and heated to reflux at approximately 130°C. and held for about 30 minutes when any water present was distilled off and separated in a trap. To this reaction mixture was added 265 parts by weight of a polycaprolactone diol sold commercially by Union Carbide Corporation under the trade name PCP 0200, and 2.75 parts by weight of benzyl dimethylamine diluted with 2.75 parts by weight of methyl isobutyl ketone. The mixture was then heated to 130°C. and held at this temperature for approximately 2 hours. The batch was thinned with 300 parts of methyl isobutyl ketone, cooled to 50°C., and 40 parts by weight of a 70 percent non-volatile solution of a diketimine derived from diethylene triamine and methyl isobutyl ketone (as described in U.S. Pat. No. 3,523,925) and 65.6 parts by weight of diethyl amine were added. The mixture was then heated to 120°C. and held for approximately 3 hours. The reaction mixture was cooled to 110°C. and 9 parts by weight of deionized water was added to the reaction mixture followed by heating to 120°C. and holding at this temperature for 2 more hours.

In order to prepare a reactive cationic plasticizer, a methylethyl ketoxime monourethane of isophorone diisocyanate was first prepared by adding 356 parts by weight of methylethyl ketoxime to 889 parts by weight of isophorone diisocyanate and 138.3 parts by weight of methyl isobutyl ketone over a 3 hour period with agitation and external cooling to maintain the batch reaction temperature below 20°C.

In another reactor, 305.7 parts by weight of the above-described methylethyl ketoxime monourethane of isophorone diisocyanate was added to 1000 parts by weight of polyoxypropylene diamine having a molecular weight of 2000, and commercially available from Jefferson Chemical Company under the trademark JEFFAMINE D-1000 possessing an amine equivalent weight of 1145, over a 20-minute period at 40°C. The mixture was thinned with 194 parts by weight of methyl isobutyl ketone to yield a reactive cationic plasticizer of 83.2 percent non-volatile content.

In another reactor, a crosslinking agent, the methylethyl ketoxime triurethane of a trifunctional aliphatic isocyanate sold by Mobay Chemical Company under the trademark DESMODUR N-100 was prepared. This crosslinking agent was prepared by charging with agitation 1420 parts by weight of the DESMODUR N-100 and 473 parts by weight of methyl isobutyl ketone to a suitable reactor. The mixture was agitated and to this agitated mixture was slowly added over the period of about 1½ hours 726 parts by weight of methylethyl ketoxime, keeping the reaction mixture below 20°C. The cooling was removed and the reaction mixture held until an infrared analysis showed no free NCO groups.

To prepare an electrodepositable thermosetting cationic urethane composition, 32.5 parts by weight of the above-described polyamine cationic resin, 7.1 parts by weight of the above-described reactive cationic plasticizer, and 12.9 parts by weight of the above-described methylethyl ketoxime triurethane, were blended together and then solubilized with 0.8 parts by weight of glacial acetic acid and 346.7 parts by weight of deionized water. This yielded an electrodeposition bath of approximately 10 percent solids with a pH of 5.6. Using conventional electrodeposition procedures, a zinc phosphate pretreated steel panel was electrocoated as a cathode at 60 volts for 2 minutes, the bath being at room temperature. The panel after rinsing was cured in an oven for 20 minutes at 350°F. The baked film was a tough, smooth, acetone-resistant coating of 1 mil thickness with a B pencil hardness.

In a manner similar to that demonstrated above, various other diamines, isocyanates, blocking agents and resins may be employed to prepare compositions within the scope of the above disclosure.

According to the provisions of the Patent Statutes, there are described above the invention and what are now considered to be its best embodiments; however, within the scope of the appended claims, it is understood that the invention can be practiced otherwise than as specifically described.

We claim:
1. A method of electrocoating an electrically-conductive surface serving as a cathode in an electrical circuit comprising said cathode, an anode and an aqueous electrodepositable composition, which electrodepositable composition comprises:
   A. an acid-solubilized polyamine group containing resin;
   B. an adduct containing a plurality of capped isocyanate groups, stable at ordinary room temperature but reactive with said polyamine resin at elevated temperatures, said adduct having been formed by the reaction of:
      1. a diamine containing an acrylic chain of greater than 5 members between its amine groups and
      2. a semi-capped organic polyisocyanate containing an average of about one free isocyanate group.

2. A method as in claim 1, wherein the diamine is alkylene diamine or a polyoxyalkylene diamine.

3. A method as in claim 1, wherein the polyamine resin contains hydroxyl groups.

4. A method as in claim 3, wherein the diamine is alkylene diamine or a polyoxyalkylene diamine.

5. A method as in claim 1, wherein resin (A) is an acid-solubilized, self-curing, synthetic organic resin containing amino groups, hydroxyl groups and capped isocyanate groups stable at room temperature in the presence of hydroxyl or amino groups and reactive with hydroxyl groups at elevated temperatures.

6. A method as in claim 5, wherein the isocyanate groups in (A) are capped by an aliphatic alkyl, alkoxyalkyl, cycloaliphatic alkyl or aromatic alkyl monoalcohol, a phenol, or an oxime.

7. A method as in claim 5, wherein the isocyanate groups and hydroxyl groups are present in a ratio of about 0.5 to about 2.0 latent isocyanate groups per hydroxyl group.

8. A method as in claim 1 in which the electrodepositable composition additionally comprises a catalyst for urethane formation.

* * * * *

UNITED STATES PATENT AND TRADEMARK OFFICE
CERTIFICATE OF CORRECTION

PATENT NO. : 3,975,250

DATED : August 17, 1976

INVENTOR(S) : Joseph R. Marchetti and Robert D. Jerabek

It is certified that error appears in the above-identified patent and that said Letters Patent are hereby corrected as shown below:

Column 1, line 56, insert --about-- after "and".

Column 4, line 66, "coomposition" should be --composition--.

Column 5, line 39, "Gambl's" should be --Gamble's--.

Column 8, line 31, "acrylic" should be --acyclic--.

Signed and Sealed this

Ninth Day of November 1976

[SEAL]

Attest:

RUTH C. MASON
Attesting Officer

C. MARSHALL DANN
Commissioner of Patents and Trademarks